United States Patent Office 3,574,774
Patented Apr. 13, 1971

---

3,574,774
FLUOROBROMOCYCLOPENTENES CONTAINING 4 TO 7 BROMINE ATOMS
Richard Garth Pews, Midland, Mich., assignor to The Dow Chemical Company, Midland, Mich.
No Drawing. Filed Mar. 13, 1969, Ser. No. 807,122
Int. Cl. C07c 23/08, 17/20
U.S. Cl. 260—648                              4 Claims

ABSTRACT OF THE DISCLOSURE

New compounds are provided in the form of fluorobromocyclopentenes characterized by the formula:

wherein $x$ is an integer from 1 to 7, $z$ is an integer from 1 to 7 and $x+z=8$. The componunds are prepared by fluorinating hexabromocyclopentadiene with antimony trifluoride.

---

The present invention relates to fluorobromocyclopentenes of the general formula

The number of bromide atoms, i.e. value of $z$, may range from 1 to 7 and the number of fluorine atoms, i.e. $x$ may range from 1 to 7. The compounds are prepared by reacting hexabromocyclopentadiene with antimony trifluoride.

Those fluorobromocyclopentenes in which the number of bromine atoms is 4 to 5, i.e. tetrafluorotetrabromocyclopentene and trifluoropentabromocyclopentene are the preferred embodiments of the present invention with with trifluoropentabromocyclopentene being the preferred species. These preferred embodiments are liquid at room temperature, exhibit high densities and relatively low viscosities and have good thermal stability. The density of trifluoropentabromocyclopentene is greater than that of tetrafluorotetrabromocyclopentene due to the additional bromine atom. Because of these properties, the compounds are especially useful as high density fluids for use in gyroscopes.

The fluorobromocyclopentenes which contain more than 5 bromine atoms, i.e. difluorohexabromocyclopentene and fluoroheptabromocyclopentene are solids at room temperature and those containing less than 4 bromine atoms, i.e. pentafluorotribromocyclopentene, hexafluorodibromocyclopentene and heptafluorobromocyclopentene have lower densities than the preferred embodiments. However, by mixing these compounds in the proper proportions, high density fluids suitable for use in gyroscopes may be obtained. For example, a mixture of pentafluorotribromocyclopentene and difluorohexabromocyclopentene would, when prepared in proper proportions, be a dense fluid.

These compounds also find utility as fire retardant additives and/or coatings for flammable plastics. For example, a mixture of about 5% of the present compositions with about 95% of a plastic material such as linear polyethylene is much less flammable than the polyethylene alone.

The compounds are prepared by reacting hexabromocyclopentadiene with antimony trifluoride at a temperature within the range of from about 0 to 100° C. The reaction is carried out in the presence of sufficient solvent to maintain the raction mass in the liquid state. Elemental bromine is the preferred solvent. However, bromine will enter into the reaction to form fluoroheptabromocyclopentene. When a product having no more than six bromine atoms is desired the reaction should be carried out in a solvent which is inert to the reactants and to the products such as a fluorocarbon oil or perchloroethylene. Preferably, elemental bromine is added to the solvent. Such addition converts the $SbF_3$ to $SbF_3Br_2$ and thus renders it a more effective fluorinating agent. For most efficient use of the $SbF_3$ the molar ratio of $Br_2$ to $SbF_3$ in the solvent should be greater than 1:1. The reaction normally goes to completion in from 4 to 12 hours with a reaction time of about 8 hours being adequate for effective conversion.

The ratio of reactants is not critical. However, for maximum conversion to tetrafluorotetrabromocyclopentene and trifluoropentabromocyclopentene the molar ratio of hexabromocyclopentadiene to antimony trifluoride should be about 2:3. An excess of hexabromocyclopentadiene, i.e. a molar ratio of greater than about 1:1 organic reagent to fluorinating agent will result in substantial amounts of difluorohexabromocyclopentene being formed and an excess of antimony trifluoride, i.e. a molar ratio greater than about 3:1 of fluorinating agent to organic reagent will result in the formation of substantial amounts of pentafluorotribromocyclopentene, hexafluorodibromocyclopentene, and heptafluorobromocyclopentene.

After the reaction has taken place, the reaction mass is concentrated until any solid fluorobromocyclopentenes formed precipitate therefrom. After separation of the liquid and solid phases, the liquid products are recovered from the solvent by conventional liquid/liquid separatory techniques such as fractional distillation or vapor phase chromatography. Conventional liquid/liquid separatory techniques may also be employed to separate the liquid fluorobromocyclopentenes of varying compositions from each other.

The following examples will serve to further illustrate the invention:

EXAMPLE I

Hexabromocyclopentadiene (108 gm.—0.2 m.), antimony trifluoride (48 gm.—0.267 m.) and 500 ml. of liquid bromine were charged to a flask and refluxed with stirring for 8 hours. At the end of this period, the bromine had distilled off leaving a liquid residue to which 500 ml. of hexane was added. The hexane extract was washed with an aqueous solution of sodium sulfite, dried over magnesium sulfate and concentrated by further distillation. On concentration by evaporation and standing a white precipitate formed which was removed by filtration and shown by mass spectral analysis to be fluoroheptabromocyclopentene and difluorohexabromocyclopentene. The mother liquor was concentrated and yielded 87 gm. of a dense liquid. Fractional distillation gave an initial product which had a boiling range of ~60–65° C. at ~2 mm. Hg. This product was shown by mass spectral and elemental analysis to be tetrafluorotetrabromocyclopentene. Further distillation gave a second fraction having a boiling range of 46–50° C. at ~0.05 mm. Hg. This fraction was shown by mass spectral and elemental analysis to be trifluoropentabromocyclopentene. Elemental analysis of tetrafluorotetrabromocyclopentene and trifluoropentabromocyclopentene gave the following results which are compared with the theoretical compositions.

|  | Found, percent | | | | Theoretical, percent | | | |
|---|---|---|---|---|---|---|---|---|
|  | C | H | Br | F | C | H | Br | F |
| $C_5Br_4F_4$ | 13.20 | 0.20 | 70.9 | 16.60 | 13.18 | 0.0 | 70.14 | 16.68 |
| $C_5Br_5F_3$ | 11.90 | 0.02 | 77.7 | 11.40 | 11.63 | 0.0 | 77.35 | 11.09 |

The density of tetrafluorotetrabromocyclopentene was found to be 2.60 gm./ml. at room temperature and trifluoropentabromocyclopentene was found to have a density of ~2.70 at room temperature.

EXAMPLE II

In a separate evaluation, the tetrafluorotetrabromocyclopentene prepared in Example 1 was tested for physical properties. The results of these tests are as follows:

Density $d^{24.5°\,C.} = 2.6099$ $d^{51.75°\,C.} = 2.5663$ $d^{57.30°\,C.} = 2.5547$ Viscosity @51.27° C.=3.5470 centistokes @57.27° C.=3.2163 centistokes Elemental analysis gave the following results:
Theory (percent): C, 13.18; Br, 70.14; F, 16.68. Found (percent): C, 13.20; Br, 70.00; F, 1660.

Mass spectral analysis confirmed the compound to be tetrafluorotetrabromocyclopentene. Nuclear magnetic resonance data suggested a mixture of isomers.

I claim:
1. An isomeric mixture of a fluorobromocyclopentene characterized by the formula:

2. An isomeric mixture of a fluorobromocyclopentene characterized by the formula:

3. An isomeric mixture of a fluorobromocyclopentene characterized by the formula:

4. An isomeric mixture of a fluorobromocyclopentene characterized by the formula:

References Cited

UNITED STATES PATENTS 2,449,233   9/1948   Kischitz et al. _____ 260—648F

OTHER REFERENCES

Henne et al.: J. Am. Chem. Soc. 67, 1235–1237 (1945).
Burdon et al.: Chem. Abstracts, 62, 9026a (1965).
Stacey et al.: vol. 3, 185–186 (1963). Advances in Fluorine Chemistry.
Hudlicky: Chemistry of Org. Fluorine Compounds, 93–94 (1962).

DANIEL D. HORWITZ, Primary Examiner

U.S. Cl. X.R.

252—8.1, 106—15; 74—5; 260—45.7